United States Patent
Iga et al.

(10) Patent No.: US 6,764,229 B1
(45) Date of Patent: Jul. 20, 2004

(54) METHOD AND APPARATUS FOR OPTICAL FIBER SPLICING

(75) Inventors: Kenichi Iga, Machida (JP); Yoshihara Kuwabara, Machida (JP); Kouji Yamamoto, Machida (JP); Jun Mizuno, Yokohama (JP)

(73) Assignees: Japan Science and Technology Corporation, Saitama (JP); Kabushiki Kaisha Kawaguchi Kogaku Sangyo, Kanagawa (JP)

(*) Notice: Subject to any disclaimer, the term of this patent is extended or adjusted under 35 U.S.C. 154(b) by 163 days.

(21) Appl. No.: 09/717,733

(22) Filed: Nov. 21, 2000

(30) Foreign Application Priority Data

Dec. 7, 1999 (JP) .......................................... 11/347238

(51) Int. Cl.[7] .............................................. G02B 6/255
(52) U.S. Cl. .......................................... 385/98; 385/97
(58) Field of Search ............................. 385/98, 97, 95, 385/135, 96, 99, 136, 137, 52

(56) References Cited

U.S. PATENT DOCUMENTS

| 4,047,283 A | * | 9/1977 | Kunze | 29/466 |
| 4,102,717 A | * | 7/1978 | Hensel | 156/64 |
| 4,248,499 A | | 2/1981 | Liertz et al. | 385/98 |
| 4,377,323 A | * | 3/1983 | Schneider | 385/98 |
| 5,497,439 A | | 3/1996 | Piffaretti et al. | 385/98 |

FOREIGN PATENT DOCUMENTS

FR          2660442          10/1991

* cited by examiner

*Primary Examiner*—David V. Bruce
*Assistant Examiner*—Chih-Cheng Glen Kao
(74) *Attorney, Agent, or Firm*—Kramer Levin Naftalis & Frankel LLP

(57) ABSTRACT

An optical fiber splicer includes a pair of retainers for retaining optical fibers to be spliced, a block formed with a groove of V-shaped cross-section, and abutment and pressure-contact mechanism for sliding terminal portions of the optical fibers in mutually opposite directions along the groove, producing substantially equal elastic forces in the terminal portions, bringing the terminal portions into abutment, and bringing the abutted terminal portions into pressure contact. An optical fiber splicing method includes a step of sliding terminal portions of optical fibers to be spliced along a groove of V-shaped cross-section in mutually opposite directions and producing substantially equal elastic forces in the terminal portions, and a step of bringing the terminal portions into abutment and then bringing the abutted terminal portions into pressure contact. An optical fiber splice structure includes terminal portions of optical, fibers spliced in a groove of V-shaped cross-section under pressure contact and exertion of substantially equal elastic forces.

1 Claim, 5 Drawing Sheets

METHOD AND APPARATUS FOR OPTICAL FIBER SPLICING

BACKGROUND OF THE INVENTION

1. Field of the Invention:

This invention relates to a splicer, splicing method and splice structure for splicing optical fibers.

2. Background Art:

Optical fibers have conventionally been spliced with a mechanical splicer.

A mechanical splicer has a general structure consisting of a base formed with a V-shaped groove (V-groove), a retaining member (flat plate) overlaid on the grooved surface of the base, and a spring for holding the base and retaining member in pressure contact.

The method typically used to splice optical fibers with the mechanical splicer involves first removing the protective coverings from the terminal portions of the optical fibers to be spliced, disposing wedges or the like to form a space between the base and the flat plate into which the exposed optical fibers can be inserted, inserting one fiber into the V-groove at one end of the base, inserting the other fiber into the V-groove at the other end of the base, bringing the two fibers into abutment, removing the wedges, and fixing the fibers by using the retaining member to apply a force orthogonal to the fibers.

Once the force of the plate spring has been applied, a force exerted in the direction of fiber abutment has no effect. Therefore, in order to prevent a gap from forming at the abutting faces of the fibers, matching oil is usually supplied to the abutment region.

Although a device for permanently splicing optical fibers, the mechanical splicer is also sometimes used for temporarily splicing fibers.

However, use of a mechanical splicer for temporary splicing is uneconomical and wasteful of material resources because the splicer is discarded after fulfilling its purpose.

A fiber splicer of nearly the same structure as the mechanical splicer but capable of repeated fiber splicing is also available.

However, this reusable splicer needs to be cleaned of oil and supplied with fresh oil every time it is used.

Moreover, when a multi-filament optical fiber bundle is spliced, differences are likely to occur in the cut length of the individual fibers. With either the mechanical splicer or the reusable fiber splicer, these differences have to be absorbed by use of matching oil. The splice efficiency is therefore likely to be unstable.

An object of the present invention is therefore to provide a splicer, splicing method and splice structure for splicing optical fibers usable with both mono-filament optical fibers and multi-filament optical fiber bundles that enable optical fibers to be directly spliced without use of a connector and splicing to be performed simply without use of matching oil.

SUMMARY OF THE INVENTION

In its first aspect, the present invention achieves this object by providing an optical fiber splicer including a pair of retaining means for retaining optical fibers to be spliced, and abutment and pressure-contact means for sliding terminal portions of the optical fibers in mutually opposite directions along a groove of V-shaped cross-section, producing substantially equal elastic forces in the terminal portions, bringing the terminal portions into abutment, and bringing the abutted terminal portions into pressure contact.

By "elastic force" here is meant force acting in the direction of restoring the optical fiber to its original state when it is flexed under application of a load.

The elastic forces produced in the terminal portions of the optical fibers gradually increase as the terminal portions slide along the groove of V-shaped cross-section (V-groove) in opposite directions and are of substantially equal magnitude.

The terminal portions of the optical fibers slide along the V-groove under identical conditions, i.e., while being imparted with equal elastic forces in the direction of forcing them into the V-groove, approach each other, abut, and are then forced into pressure contact.

The splicer according to this aspect of the invention therefore enables optical fibers to be easily spliced with high precision, i.e., with substantially no offset between the centers of their terminal portions, without use of a connector or matching oil.

The action and effect of the splicer can be enjoyed not only with mono-filament optical fibers but also with multi-filament optical fiber bundles.

The individual optical fibers act as springs (produce elastic force). Because of this, each produces its own independent pressure-contact force in the direction of the optical fiber with which it is to mate and can therefore absorb any difference in cut length that may arise.

The abutment and pressure-contact means can be a drive mechanism for moving a block formed with the groove of V-shaped cross-section or can be a rotating mechanism for rotating the pair of retaining means.

The splicer can therefore splice optical fiber without using a connector.

The abutment and pressure contact means is not limited to a drive or rotating mechanism but can instead be a slide mechanism as explained in the following.

The optical fiber splicer is preferably equipped with a pressure limiting mechanism for limiting pressure applied by the abutment and pressure contact means to a prescribed value.

The pressure limiting mechanism is provided to protect the optical fibers from breakage by stress in excess of the allowable limit.

In its second aspect, the present invention achieves its object by providing an optical fiber splicing method comprising a step of sliding terminal portions of optical fibers to be spliced along a groove of V-shaped cross-section in mutually opposite directions and producing substantially equal elastic forces in the terminal portions, and a step of bringing the terminal portions into abutment and then bringing the abutted terminal portions into pressure contact.

In its third aspect, the present invention achieves its object by providing an optical fiber splice structure comprising terminal portions of optical fibers spliced in a groove of V-shaped cross-section under pressure contact and exertion of substantially equal elastic forces.

The second and third aspects of the invention provide the same effects and advantages as the first.

In the splicer, splicing method and splice structure for splicing optical fibers according to this invention, the operations of sliding the optical fibers, bringing them into abutment, and bringing them into pressure contact are preferably conducted respectively and simultaneously in the manner of a continuous operation.

In the splicing method and splice structure for splicing optical fibers according to this invention, force is preferably applied to the fibers through a means such as the aforesaid pressure limiting mechanism so as to prevent application of more than a prescribed amount of contact pressure at the abutted fiber faces.

DESCRIPTION OF THE PREFERRED EMBODIMENTS

Embodiments of the optical fiber splicer according to the present invention (hereinafter also referred to simply as "splicer") will now be explained with reference to the drawings.

Figure 1:
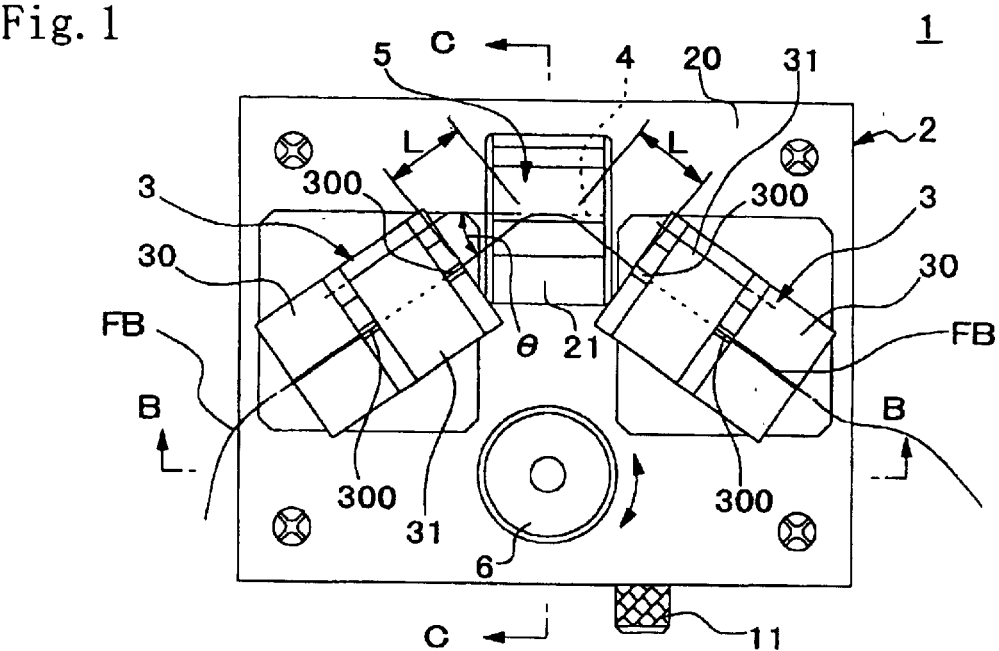
FIG. 1 is a plan view of an optical fiber splicer that is a first embodiment of the invention.
Figure 2:
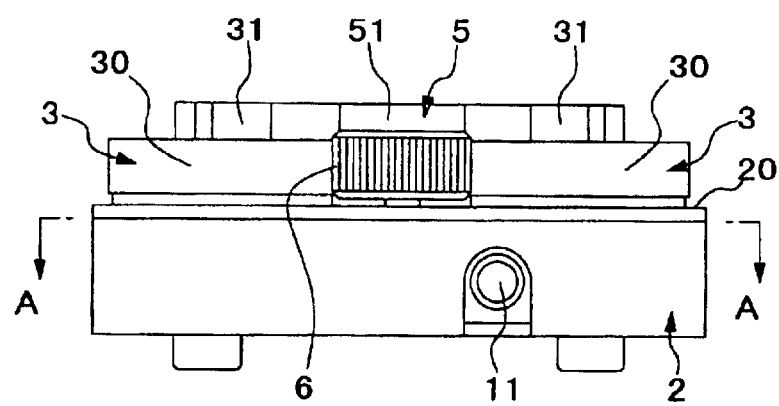
FIG. 2 is a front view of the splicer of FIG. 1.
Figure 3:
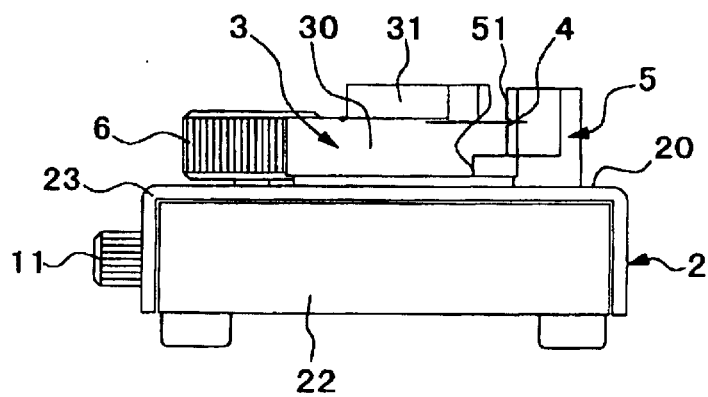
FIG. 3 is a side view of the splicer of FIG. 1.

FIGS. 1–3 show plan, front and side views of a splicer that is a first embodiment of the present invention.

Figure 4:
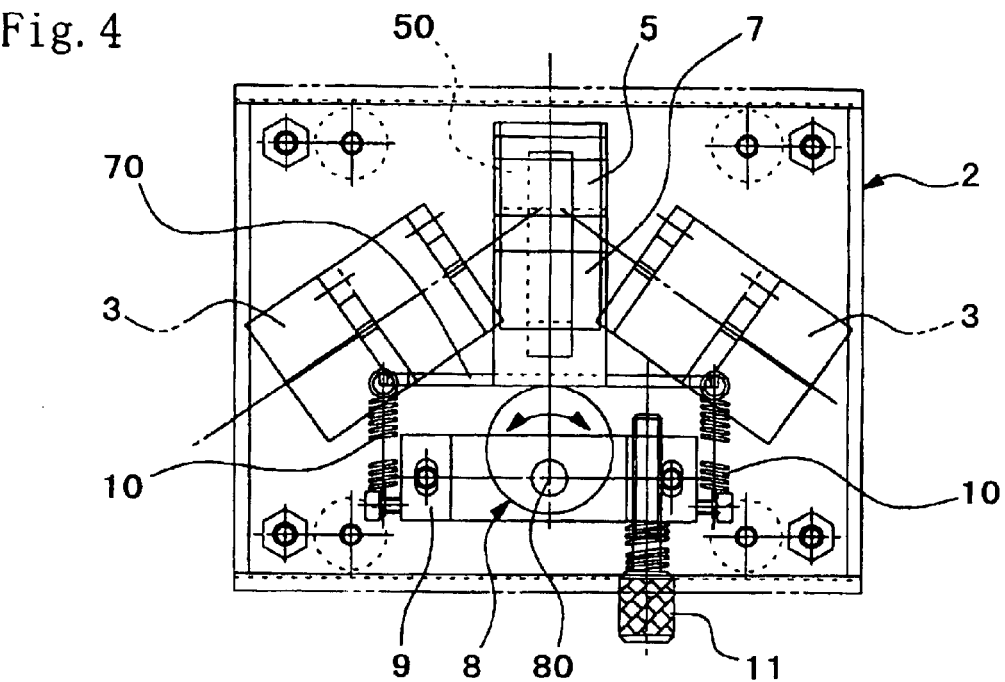
FIG. 4 is a sectional view taken along line A—A in FIG. 2.
Figure 5:
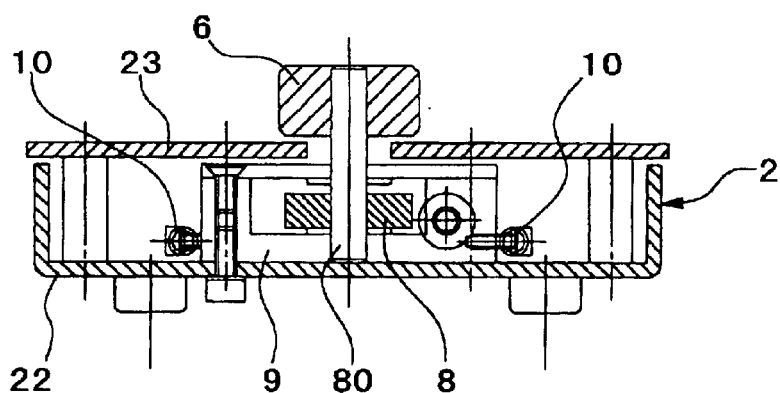
FIG. 5 is a sectional view taken along line B—B in FIG. 1.
Figure 6:
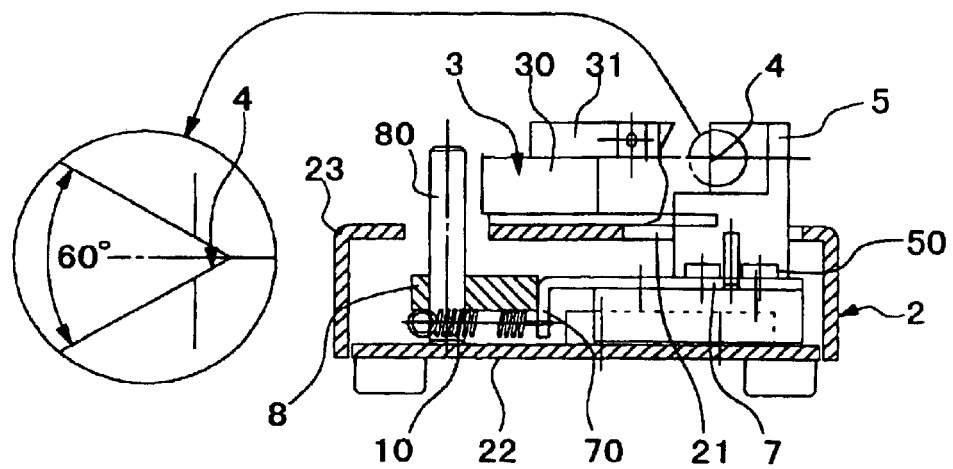
FIG. 6 is a sectional view taken along line C—C in FIG. 1.
Figure 7:
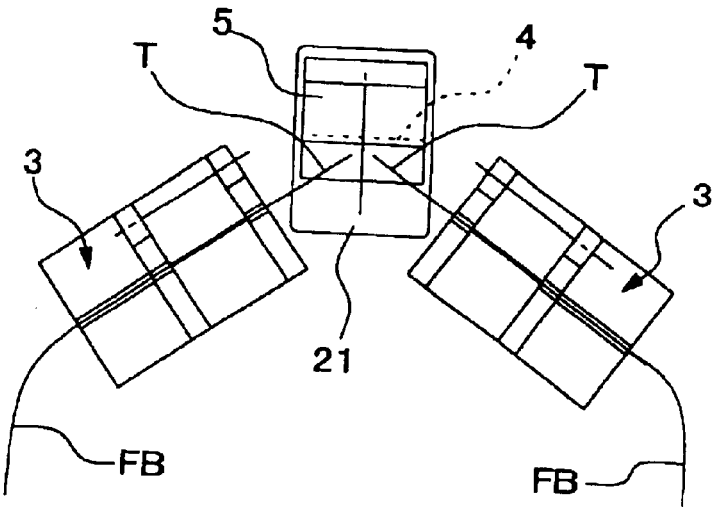
FIG. 7 is a schematic view for explaining the operation of the splicer.

FIGS. 4, 5 and 6 show sectional views taken along lines A—A, B—B and C—C in FIG. 2, FIG. 1 and FIG. 1, respectively.

To avoid unnecessary repetition, like members are assigned like reference symbols in these and the other figures referred to in the following explanation and each will be explained only once.

As shown in FIGS. 1–3, a splicer 1 comprises a body 2 provided on its upper surface 20 with a pair of fiber holders 3, 3 constituting the aforesaid retaining means, a block 5 formed with a groove of V-shaped cross-section (V-groove) 4 that is located in an opening 21 formed in the body 2, and a dial 6 operable for moving the block 5 up and down (as viewed in FIG. 1) within the opening 21.

The body 2 consists of a housing 22 and a cover 23. As shown in FIGS. 4–6, the interior of the body 2 accommodates a slide member 7 whose one end is fixed to the undersurface 50 of the block 5 and whose other end is provided with a laterally long arm 70, a shaft 80 having the dial 6 and an eccentric cam 8 coaxially fixed thereon, a base 9 for axially supporting the eccentric cam 8, and tension springs 10, 10 for energizing the slide member 7 toward the eccentric cam 8.

The dial 6, slide member 7, eccentric cam 8 and tension springs 10, 10 constitute a drive mechanism and the aforesaid abutment and pressure-contact means.

Each of the holders 3, 3 comprises a base plate 30 and a flat plate 31. The base plate 30 is fastened to the cover 23 of the body 2 and its surface is formed with a groove 300 for defining the position of a fiber FB.

The flat plate 31 is attached to the base plate 30 through a hinge or the like so that after a fiber FB has been set in the groove 300 of the base plate 30, the flat plate 31 can be swung into face-to-face contact with the base plate 30 for immobilizing the fiber FB.

The V-groove 4 is formed in the surface 51 of the block 5 facing the holders 3, 3 in the shape shown in FIG. 6 to extend substantially horizontally at approximately the same height level as the grooves 300.

As best seen in FIG. 1, the holders 3, 3 and the block 5 are positioned relative to one another such that an imaginary extension of each groove 300 (extension of the fiber FB immobilized therein) meets the V-groove 4 of the block 5 at an angle θ of around 30 to 40 degrees and that the holders 3, 3 are spaced from the block 5 by the same distance L.

The member designated by reference symbol 11 is an adjustable stop for fine adjustment of the position of the base 9.

Figure 8:
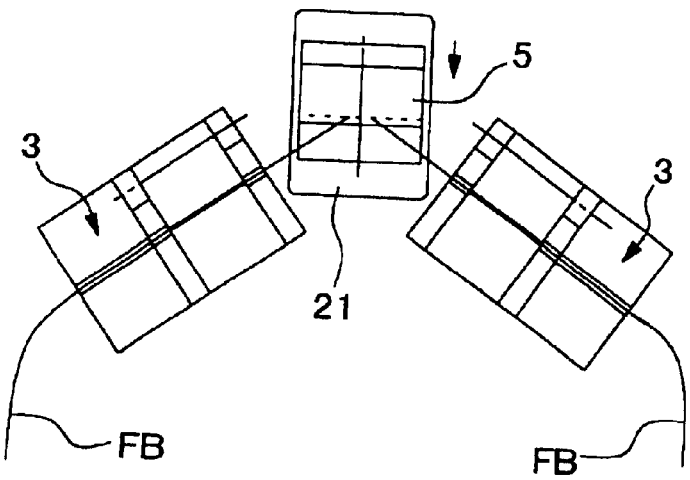
FIG. 8 is a schematic view for explaining the operation of the splicer.
Figure 9:
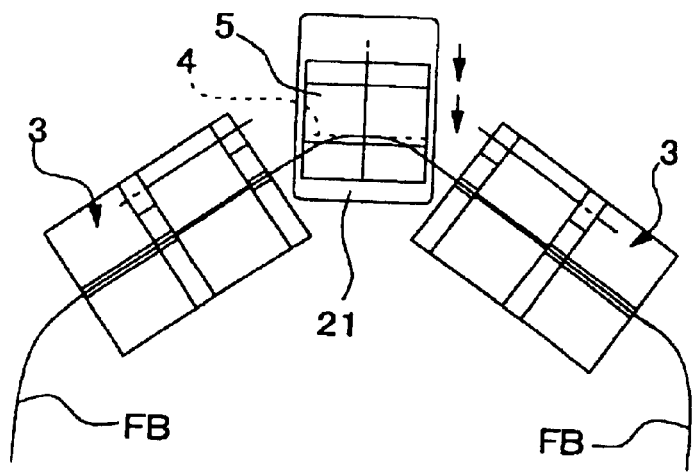
FIG. 9 is a schematic view for explaining the operation of the splicer.

The method of using the splicer 1 configured in the foregoing manner will now be explained with reference to FIGS. 8–10.

First, the fibers FB, FB to be spliced are attached to the holders 3, 3.

This attachment is preferably made so that the abutting faces S, S of the terminal portions T, T (see FIG. 10) of the fibers FB, FB are spaced from the V-groove 4 of the block 5 by the same distance.

The dial 6 is then rotated in one direction or the other. The rotation is transmitted through the shaft 80 to the eccentric cam 8 to cause progressive movement of slide member 7 under the force of the tension springs 10, 10. The block 5 attached to the slide member 7 therefore approaches the terminal portions T, T of the fibers FB, FB and their abutting faces S, S eventually make contact with the V-groove 4 substantially simultaneously (see FIG. 8).

With further rotation of the dial 6, the block 5 applies loads W, W the terminal portions T, T of the fibers FB, FB, causing them to flex and simultaneously advance along the V-groove 4 in opposite directions.

Figure 10:
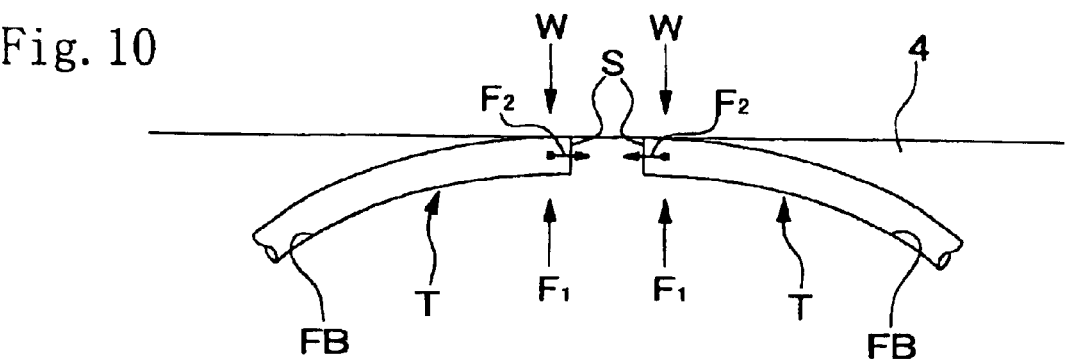
FIG. 10 is a schematic view for explaining the operation of the splicer.

The relationship between the V-groove 4 and the terminal portions T, T of the fibers FB, FB at this time is illustrated in FIG. 10. It will be noted that elastic forces F1, F1 of substantially equal magnitude act to produce approximately identical elastic curvature in the terminal portions T, T.

Moreover, since substantially equal and opposite forces F2, F2 act on the terminal portions T, T, the centers of the abutting faces S, S approach each other along substantially the same line and can therefore be abutted in precise alignment.

As a result, the fibers FB, FB are optically joined in facing relationship.

As explained in the foregoing, this method of splicing the fibers FB, FB consists in sliding the terminal portions T, T of the fibers FB, FB along the V-groove 4 in mutually opposite directions, imparting substantially equal elastic forces F1, F1 thereto, bringing the abutting faces S, S of the terminal portions T, T of the fibers FB, FB into abutment, and thereafter forcing the abutting faces S, S into pressure contact.

The implementation of this method therefore produces an optical fiber splice structure comprising the terminal portions T, T of the fibers FB, FB spliced in the V-groove 4 under pressure contact with opposite forces F2,F2 and exertion of substantially equal elastic forces F1, F1.

Although the flat plate 31 is hinged to the base plate 30 in this embodiment, the invention is not limited to this arrangement and the two plates can instead be maintained in tight contact by any of various other means such as screws.

Figure 11:
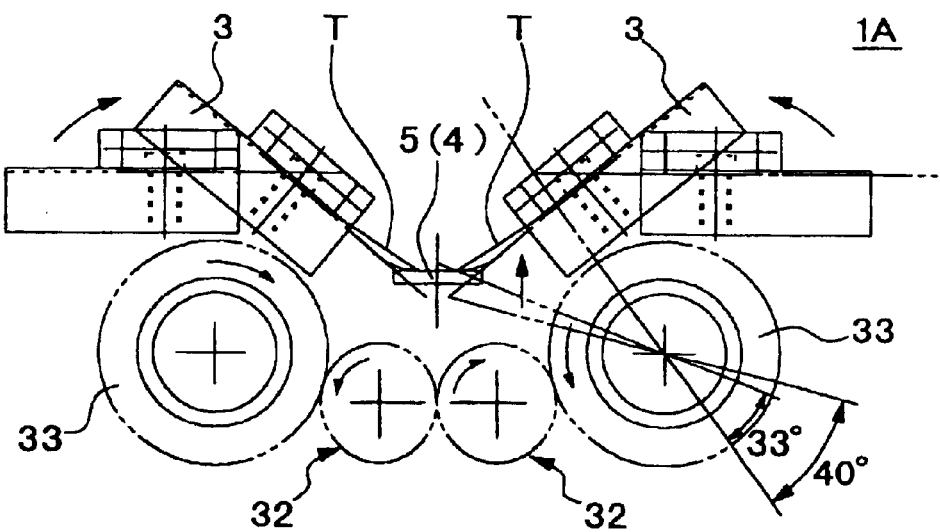
FIG. 11 is a diagram illustrating a splicer that is a second embodiment of the invention.

Further, the invention is not limited to the foregoing horizontal holders 3, 3 having the base plates 30 and flat plates 31 stacked vertically but can instead utilize vertical holders 3, 3 having the base plates 30 and flat plates 31 stacked horizontally (see FIG. 11).

The splicer 1, splicing method and splice structure explained in the foregoing enable the abutting faces S, S of the fibers FB, FB to be abutted with substantially no offset between their centers.

They also eliminate the need for matching oil because the fibers FB, FB are spliced and pressure-contacted utilizing their own elasticity.

The fact that the fibers FB, FB are pressed onto each other by elastic force means that the conditions of the splicing can be made identical even among the individual fibers of a multi-filament optical fiber bundle, so that optical splicing of all fibers can be achieved without need for matching oil.

Other advantages of the splicer, splicing method and splice structure according to this invention include that the splicing operation and condition can be readily observed visually and than no connector or the like is required.

In addition, the splicer 1 can be utilized repeatedly without need for troublesome oil cleaning and replenishment, since splicing can be achieved without use of matching oil.

The invention therefore provides a simple, convenient means for splicing optical fibers in the laboratory in cases where some amount of transmission loss or change in performance with aging can be tolerated.

For person working in the field of telecommunications, on the other hand, it provides a splicer that is useful for temporarily splicing multi-filament optical fiber bundles and mono-filament optical fibers during optical fiber installation.

The amount of elongation (elongation percentage; contraction being considered negative elongation) of the tension springs 10, 10 connected between the arm 70 of the slide member 7 and the base 9 is set with a view to preventing breakage of the fibers FB, FB by pressure contact forces F2, F2 that exceed the allowable stress of the fibers FB, FB.

More specifically, the arrangement is such that if the eccentric cam 8 should be rotated to a point beyond the set amount of elongation (contraction) of the tension springs 10, 10, the tension springs 10, 10 hold the block 5 provided with the V-groove 4.

In other words, the tension springs 10, 10 function as a pressure limiting mechanism that prevents greater than the allowable stress from acting on the fibers FB, FB and thus protects the fibers FB, FB from breakage.

A pressure mechanism utilizing gravitational force instead of the tension springs 10, 10 can also be used.

A splicer 1A that is a second embodiment of the present invention will now be explained with reference to FIG. 11.

The splicer 1A differs from the splicer 1 in the means it uses for abutting and pressure-contacting the optical fibers to be spliced. Specifically, it uses a rotating mechanism for rotating the holders 3, 3 in place of the drive mechanism for moving the holders 3, 3.

The rotating mechanism comprises a pair of driving gears 32, 32 and a pair of driven gears 33, 33. The holders 3, 3 are installed vertically to rotate synchronously with the rotation of the driven gears 33, 33.

The holders 3, 3 initially oppose each other at 180 degrees. After attachment of the fibers FB, FB to be spliced, they are rotated in opposite directions by around 40 degrees each so as to make their opposing faces swing downward in FIG. 11, thus sliding the terminal portions T, T of fibers FB, FB along the V-groove 4 in mutually opposite directions, imparting substantially equal elastic forces F1, F1 thereto, bringing the abutting faces S, S of the terminal portions T, T of the fibers FB, FB into abutment, and thereafter forcing the abutting faces S, S into pressure contact.

The force of the pressure contact can, as in the first embodiment, be applied through springs that also function as a pressure limiting mechanism. Otherwise, the block 5 with V-groove can be supported by a parallel translation mechanism and a pressure limiting mechanism be constituted of springs independently of the rotating mechanism (see FIG. 12(d)).

In other aspects, the second embodiment provides the same effects and advantages as the first.

A splicer 1B that is a third embodiment of the present invention will now be explained with reference to FIGS. 12(a)–12(d).

In the splicer 1B, the holders 3, 3 constituted of the base plates 30 and flat plates 31 are mounted on slide guides 34, 34 to be slidable toward and away from the block 5 formed with the V-groove 4. The holders 3, 3 are operated by a slide mechanism that moves them toward the block 5 with substantially identical timing.

The block 5 of the splicer 1B is equipped with a pressure limiting mechanism composed of a parallel translation mechanism 35 for restricting movement of the block 5 to a single direction and a force limiting spring 36.

The slide mechanism and the parallel translation mechanism 35 can be of conventional configuration. The slide mechanism, for instance, can utilize gear and/or belt means.

Figure 12:
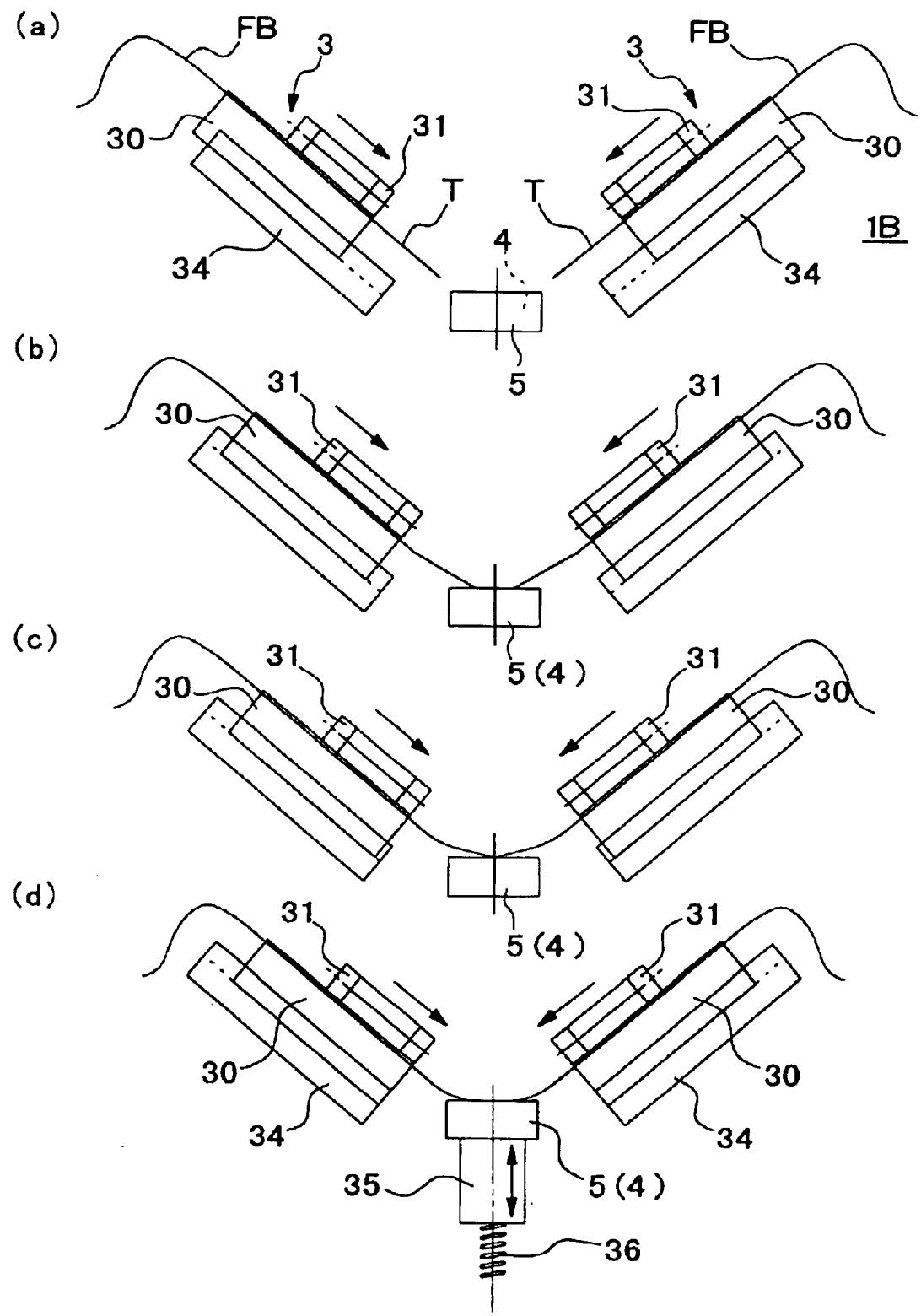
FIGS. 12(a) to 12(d) are diagrams for explaining the structure and operation of a splicer that is a third embodiment of the invention.

FIG. 12(a) shows the holders 3, 3 of the splicer 1B just after attachment of the fibers FB, FB. The holders 3, 3 are then slowly and simultaneously slid toward the block 5 as shown in FIG. 12(b).

As the holders 3, 3 continue moving toward the block 5, the fiber terminal portions T, T to be abutted slide along the V-groove 4 as shown in FIG. 12(c), thus bringing the abutting faces S, S of the terminal portions T, T into abutment. Then as shown in FIG. 12(d), the abutting faces S, S are brought into pressure contact by further sliding of the holders 3, 3.

At this time, the pressure limiting mechanism prevents breakage of the fibers FB, FB owing to excessive stress.

In other aspects, the third embodiment provides the same effects and advantages as the first.

The optical fiber splicer and splice structure according to the present invention enable optical fibers to be spliced with high precision, i.e., with substantially no offset between the centers of their terminal portions, without use of a connector or matching oil.

Since the optical fibers are pressed onto each other by springs, moreover, the conditions of the splicing can be made identical even among the individual fibers of a multi-filament optical fiber bundle, so that optical splicing of all fibers can be achieved without need for matching oil.

The splicing condition can be readily ascertained by visual observation.

Moreover, repeated splicing is possible without need for troublesome oil cleaning and replenishment, because no matching oil is required for splicing.

The splicing method of the present invention protects the optical fibers from breakage by stress in excess of the allowable limit.

What is claimed is:

1. An optical fiber splicer comprising:

a pair of retaining means for retaining optical fibers to be spliced;

a block having a groove of V-shaped cross-section; and abutment and pressure-contact means for sliding terminal portions of said optical fibers in mutually opposite directions along said groove of V-shaped cross-section producing substantially equal elastic forces in said terminal portions, bringing said terminal portions into abutment and bringing said abutted terminal portions into pressure contact, said abutment and pressure-contact means including a slide member having a first end fixed to the undersurface of said block and a second end having a laterally extending arm, a shaft having means for adjusting the vertical position of said block and an eccentric cam coaxially fixed on said shaft, a base for axially supporting said eccentric cam, an adjustable stop for fine adjustment of the position of said base, tension springs connected between said arm of said slide member and said base for energizing said slide member toward said eccentric cam, the amount of elongation of said tension springs capable of being set to avoid breakage of said fibers by pressure contact forces that exceed the stress tolerance of said fibers, said tension springs holding said block when said eccentric cam is rotated beyond the set amount of elongation of said tension springs, and a housing for accommodating said slide member, said laterally extending arm, said shaft, said eccentric cam, said base and said tension springs.

* * * * *